US012803357B2

(12) United States Patent
Chae et al.

(10) Patent No.: US 12,803,357 B2
(45) Date of Patent: Nov. 17, 2026

(54) SIX-PHASE MOTOR

(71) Applicants: HYUNDAI MOTOR COMPANY, Seoul (KR); KIA CORPORATION, Seoul (KR)

(72) Inventors: Min Ho Chae, Incheon (KR); Ho Jun Shin, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 323 days.

(21) Appl. No.: 18/606,262

(22) Filed: Mar. 15, 2024

(65) Prior Publication Data

US 2025/0105692 A1 Mar. 27, 2025

(30) Foreign Application Priority Data

Sep. 26, 2023 (KR) ........................ 10-2023-0129673

(51) Int. Cl.
*H02K 3/28* (2006.01)
*H02K 1/16* (2006.01)
*H02K 11/00* (2016.01)

(52) U.S. Cl.
CPC ................. *H02K 3/28* (2013.01); *H02K 1/16* (2013.01); *H02K 11/0094* (2013.01)

(58) Field of Classification Search
CPC .... H02K 11/30; H02K 11/33; H02K 11/0094; H02K 3/28; H02K 1/16; H02K 21/14
USPC ........................................................ 310/68 R
See application file for complete search history.

(56) References Cited

U.S. PATENT DOCUMENTS

| | | | | |
|---|---|---|---|---|
| 5,274,322 A * | 12/1993 | Hayashi | .................. | H02K 3/28 310/198 |
| 2020/0373801 A1 * | 11/2020 | Kinjo | .................. | H02M 7/493 |

FOREIGN PATENT DOCUMENTS

| | | |
|---|---|---|
| WO | 2018142635 A1 | 8/2018 |
| WO | 2022045400 A1 | 3/2022 |

* cited by examiner

*Primary Examiner* — Alexander A Singh
(74) *Attorney, Agent, or Firm* — Lempia Summerfield Katz LLC

(57) ABSTRACT

A six-phase motor includes: a rotor including a plurality of magnets; a stator disposed to form an air gap together with the rotor; a first-type three-phase coil provided at the stator and constituted by a plurality of first-type coils; a second-type three-phase coil constituted by a plurality of second-type coils each wound to have a smaller number of turns than a number of turns of each of the first-type coils; a first inverter configured to drive the first-type three-phase coil; and a second inverter configured to drive the second-type three-phase coil while having a greater maximum output than a maximum output of the first inverter.

12 Claims, 6 Drawing Sheets

SIX-PHASE MOTOR

CROSS-REFERENCE TO RELATED APPLICATION

This application claims the benefit of and priority to Korean Patent Application No. 10-2023-0129673 filed on Sep. 26, 2023 in the Korean Intellectual Property Office, the disclosure of which is incorporated herein by reference.

BACKGROUND

1. Technical Field

The present disclosure relates to a structure of a motor for driving a vehicle.

2. Description of the Related Art

A hybrid vehicle, an electric vehicle, or the like generates drive power required for driving the vehicle by operating a motor using electric power provided from a battery equipped in the vehicle.

The motor for the above-mentioned vehicle should have high efficiency to reduce the amount of electricity needed and to improve the output performance of the vehicle.

The above subject matter disclosed in this section is merely to enhance understanding of the general background of the disclosure. The above should not be taken as an acknowledgment or any form of suggestion that the subject matter forms the related art already known to a person of ordinary skill in the art.

SUMMARY

Therefore, the present disclosure has been made in view of the above problems. It is an object of the present disclosure to provide a six-phase motor capable of reducing iron loss and field weakening control loss according to an operating point, as compared to conventional motors. This enhances the efficiency of the motor and increases the maximum output of the motor to achieve enhanced output performance of a vehicle. Enhanced electricity economy, i.e., reduced electricity consumption of the vehicle is also achieved.

It should be appreciated by persons of ordinary skill in the art to which the present disclosure pertains that technical problems to be solved by the present disclosure are not limited to the above-described technical problems. Other technical problems should be more clearly understood from the following description.

In accordance with the present disclosure, the above and other objects can be accomplished by the provision of a six-phase motor. The six-phase motor includes a rotor having a plurality of magnets and a stator disposed to form an air gap together with the rotor. The six-phase motor also includes a first-type three-phase coil provided at the stator and constituted by a plurality of first-type coils and a second-type three-phase coil constituted by a plurality of second-type coils each wound to have a smaller number of turns than a number of turns of each of the first-type coils. The six-phase motor also includes a first inverter configured to drive the first-type three-phase coil and a second inverter configured to drive the second-type three-phase coil while having a greater maximum output than a maximum output of the first inverter.

The number of turns of the first-type coils may be two times the number of turns of the second-type coils.

The maximum output of the second inverter may be greater than the maximum output of the first inverter by 10% or more.

Both the first-type coils and the second-type coils may be inserted into corresponding slots of the stator, respectively.

The first-type three-phase coil may be constituted by an A-phase coil, a B-phase coil, and a C-phase coil. The second-type three-phase coil may be constituted by an X-phase coil, a Y-phase coil, and a Z-phase coil. The A-phase coil, the B-phase coil, and the C-phase coil may be sequentially disposed in a circumferential direction of the stator. The X-phase coil, the Y-phase coil, and the Z-phase coil may be sequentially disposed in a disposition direction of the A-phase coil, the B-phase coil, and the C-phase coil.

The A-phase coil, the B-phase coil, the C-phase coil, the X-phase coil, the Y-phase coil, and the Z-phase coil may be disposed such that an A-phase, an X-phase, a B-phase, a Y-phase, a C-phase, and a Z-phase are sequentially and repeatedly formed in the circumferential direction of the stator.

The X-phase coil may be inserted into a slot into which the A-phase coil has been inserted and into a slot into which the B-phase coil has been inserted. The Y-phase coil may be inserted into another slot into which the B-phase coil has been inserted and into a slot into which the C-phase coil has been inserted. The Z-phase coil may be inserted into another slot into which the C-phase coil has been inserted and into another slot into which the A-phase coil has been inserted.

The A-phase coil may be inserted into an i-th slot and an i+1-th slot of the stator neighboring each other. The B-phase coil may be inserted into an i+2-th slot and an i+3-th slot of the stator. The C-phase coil may be inserted into an i+4-th slot and an i+5-th slot of the stator. The X-phase coil may be inserted into the i+1-th slot and the i+2-th slot of the stator. The Y-phase coil may be inserted into the i+3-th slot and the i+4-th slot of the stator. The Z-phase coil may be inserted into the i+5-th slot and the i-th slot of the stator.

Each of the A-phase coil, the B-phase coil, the C-phase coil, the X-phase coil, the Y-phase coil, and the Z-phase coil may be continuously inserted into adjacent slots corresponding in number to a multiple of 2.

The A-phase coil, the B-phase coil, and the C-phase coil may be inserted into portions of slots corresponding to an outer portion of the stator in a radial direction. The X-phase coil, the Y-phase coil, and the Z-phase coil may be inserted into portions of slots corresponding to an inner portion of the stator in the radial direction.

The first-type coils and the second-type coils may be constituted by windings having different thicknesses, respectively.

The first-type coils and the second-type coils may be configured to be alternately inserted into a plurality of slots disposed in a circumferential direction of the stator.

The first-type coil may be constituted by an A-phase coil, a B-phase coil, and a C-phase coil. The second-type coil may be constituted by an X-phase coil, a Y-phase coil, and a Z-phase coil. The A-phase coil, the X-phase coil, the B-phase coil, the Y-phase coil, the C-phase coil, and the Z-phase coil may be sequentially disposed in the plurality of slots disposed in the circumferential direction of the stator.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION

Figure 1:
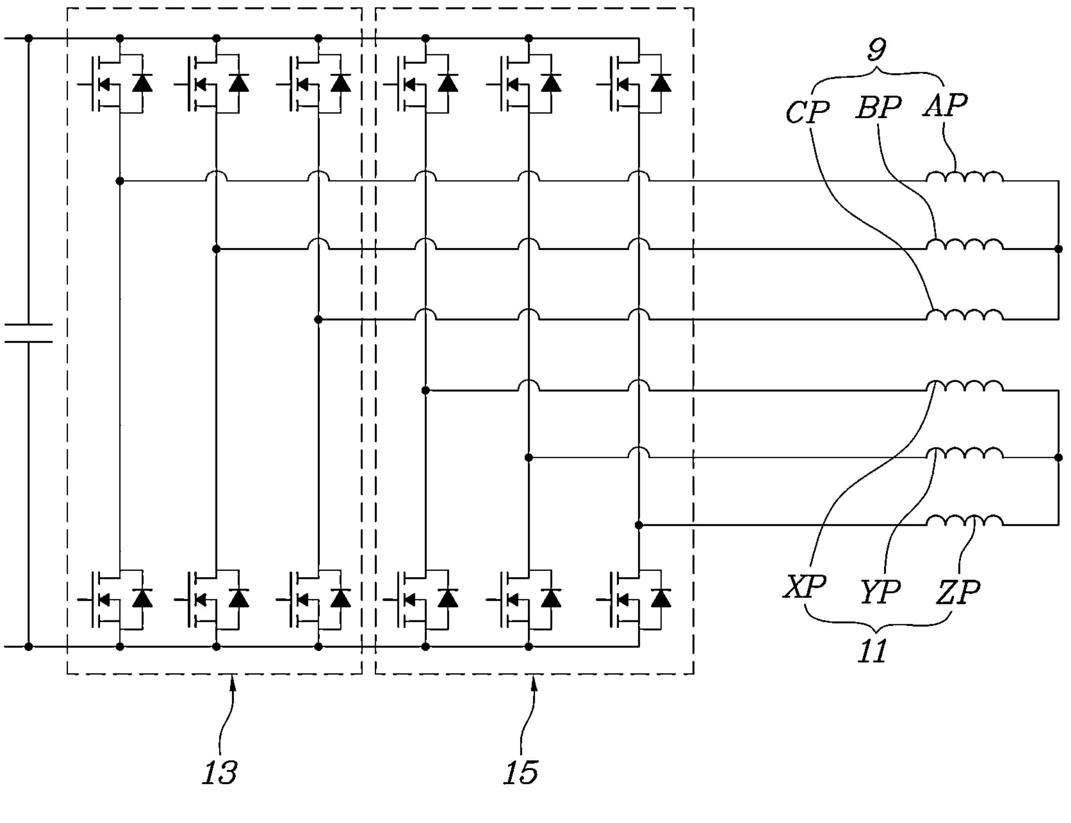
FIG. 1 is a circuit diagram for a six-phase motor according to the present disclosure.

Hereinafter, embodiments of the present disclosure are described in detail with reference to the accompanying drawings. The same or similar elements are designated by the same reference numerals regardless throughout the drawings and redundant description thereof have been omitted.

The suffixes "module" and "unit" for elements herein are used for convenience of description and thus can be used interchangeably and do not have any distinguishable meanings or functions.

In the following description of embodiments of the present disclosure, a detailed description of known functions and configurations incorporated herein has been omitted where it may have obscured the subject matter of the embodiments of the present disclosure. In addition, the embodiments of the present disclosure should be more clearly understood from the accompanying drawings and should not be limited by the accompanying drawings. It should be appreciated that all changes, equivalents, and substitutes that do not depart from the spirit and technical scope of the present disclosure are encompassed in the present disclosure.

It should be understood that, although the terms "first," "second," and the like may be used herein to describe various elements, these elements should not be limited by these terms. These terms are only used to distinguish one element from another.

When an element is described as being "connected" or "linked" to another element, it should be understood that the element may be directly connected or linked to the other element or that another element may be present therebetween. Conversely, when an element is described as being "directly connected" or "directly linked" to another element, it should be understood that no other element is present therebetween.

Unless clearly used otherwise, singular expressions include a plural meaning. When a component, device, element, or the like of the present disclosure is described as having a purpose or performing an operation, function, or the like, the component, device, or element should be considered herein as being "configured to" meet that purpose or to perform that operation or function.

In this specification, the terms "comprising," "including," or the like, and variations thereof, are intended to express the existence of the characteristic, the numeral, the step, the operation, the element, the part, or the combination thereof. Such terms do not exclude another characteristic, numeral, step, operation, element, part, or any combination thereof, or any addition thereto.

Referring to FIGS. 1-5, six-phase motors according to embodiments of the present disclosure are shown. The six-phase motor according to each embodiment of the present disclosure is configured through inclusion of a rotor 3 including a plurality of magnets 1. The motor also includes a stator 7 disposed to form an air gap 5 together with the rotor 3. The motor also includes a first-type three-phase coil provided at the stator 7 and constituted by a plurality of first-type coils 9 and a second-type three-phase coil constituted by a plurality of second-type coils 11 each wound to have a smaller number of turns than that of each first-type coil 9. The motor also includes a first inverter 13 configured to drive the first-type three-phase coil and a second inverter 15 configured to drive the second-type three-phase coil while having a greater maximum output than that of the first inverter 13.

For example, the number of turns of the first-type coils 9 may be two times the number of turns of the second-type coils 11.

In other words, when the number of turns of the first-type coils 9 is eight, the number of turns of the second-type coils 11 is four.

In this case, the maximum output of the second inverter 15 is greater than the maximum output of the first inverter 13 by 10% or more.

It may be regarded that the first-type three-phase coil constitutes a first partial motor together with the rotor 3 and that the second-type three-phase coil constitutes a second partial motor together with the rotor 3.

In other words, the six-phase motor of the present disclosure may function as the first partial motor when current is applied only to the first-type three-phase coil. Further, the six-phase motor of the present disclosure may function as the second partial motor when current is applied only to the second-type three-phase coil. On the other hand, when current is applied to both the first-type three-phase coil and the second-type three-phase coil, the six-phase motor of the present disclosure may function as a six-phase motor.

Accordingly, the first inverter 13 drives the first partial motor and the second inverter 15 drives the second partial motor. When the second inverter 15 drives the second partial motor, it may be possible to control the second partial motor at a greater maximum output than that of the first inverter 13 by 10% or more.

When the above-described six-phase motor of the present disclosure, which has different numbers of turns, is driven to operate as a six-phase motor, there is an advantage in that a maximum torque output from the motor may be maximized when the second partial motor having a relatively small number of turns is driven by a higher inverter output than that of the first partial motor having a relatively great number of turns.

In other words, in a six-phase motor in which configurations of a first-type three-phase coil and a second-type three-phase coil are identical, a maximum torque that may be output from the motor is not higher than that of the motor of the present disclosure when the first inverter 13 and the second inverter 15 are configured to generate the same maximum output.

When the above-described relations are compared through detailed examples, comparison results may be represented by the following table.

TABLE 1

| Items | Unit | Conventional Six-Phase Motor (First-Inverter Output = Second-Inverter Output) | | Six-Phase Motor with Different Turns (First-Inverter Output = Second-Inverter Output) | | Six-Phase Motor with Different Turns (First-Inverter Output < Second-Inverter Output) | |
|---|---|---|---|---|---|---|---|
| | | First Partial Motor | Second Partial Motor | First Partial Motor | Second Partial Motor | First Partial Motor | Second Partial Motor |
| Number of Turns | TURN | 6 | 6 | 8 | 4 | 8 | 4 |
| Maximum Torque | Nm | 250 | 250 | 333 | 167 | 250 | 250 |
| Maximum Phase Current | Arms | 500 | 500 | 500 | 500 | 375 | 750 |
| Phase Current Sum | Arms | 1,000 | | 1,000 | | 1,125 | |
| Input Voltage | V | | | Constant | | | |
| Output Sum | % | 100 (Reference) | | 100 | | 112.5 | |

The conventional six-phase motor is represented in Table 1 as being divided into a first partial motor and a second partial motor. For comparison of the conventional motor with the present disclosure, it is unnecessary to substantially divide the conventional six-phase motor into the first partial motor and the second partial motor. This is because both a three-phase coil constituting the first partial motor and a three-phase motor constituting the second partial motor have six turns (i.e., have the same number of turns). Similarly, the first inverter and the second inverter have the same specifications and, as such, generate the same maximum output.

The six-phase motor with different numbers of turns, which is a rightmost one of the motors in Table 1, is configured according to the present disclosure. In such a motor, an output of the first inverter thereof is lower than that of the second inverter thereof and both a maximum torque of the first partial motor thereof and a maximum torque of the second partial motor thereof are 250 Nm (i.e., are equal). The six-phase motor with different numbers of turns, which is a middle one of the motors in Table 1 and in which an output of the first inverter thereof and an output of the second inverter thereof are equal, is also represented in Table 1, for comparison with the six-phase motor of the present disclosure. This six-phase motor is referred to as a "comparative six-phase motor with different numbers of turns".

Figure 5:
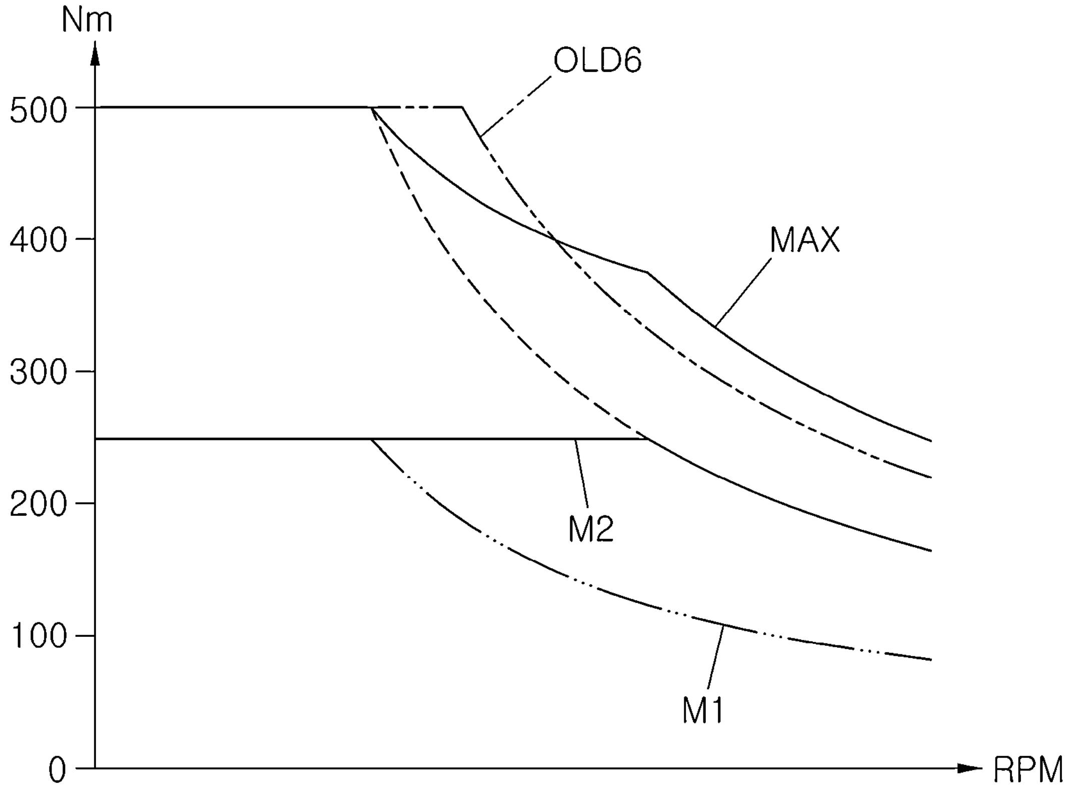
FIG. 5 is a graph depicting an output of a motor according to the present disclosure and for explaining a case in which a first partial motor constituted by a first-type three-phase coil and a second partial motor constituted by a second-type three-phase coil are controlled to have the same maximum torque.

Meanwhile, FIG. 5 depicts a motor output where the first partial motor constituted by the first-type three-phase coil and the second partial motor constituted by the second-type three-phase coil are controlled to have the same maximum torque of 250 Nm. FIG. 5 is a graph showing a motor output.

In FIG. 5, an output of the conventional six-phase motor is indicated by "OLD6", an output of the first partial motor is indicated by "M1", an output of the second partial motor is indicated by "M2", and an output where maximum torques of the first partial motor and the second partial motor are controlled to be equal (i.e., to be 250 Nm), is indicated by "MAX".

Figure 6:
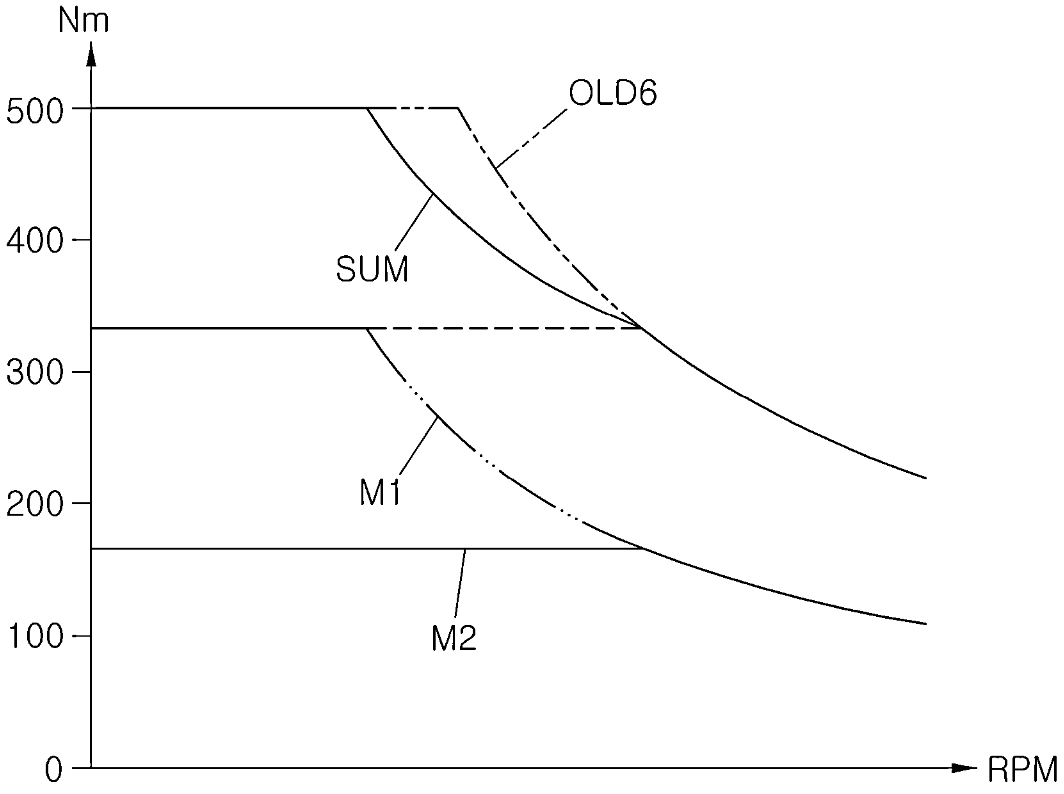
FIG. 6 is a graph depicting an output of a comparative six-phase motor with different numbers of turns for comparison to FIG. 5 and for explaining a case in which maximum currents respectively applied to a first partial motor constituted by a first-type three-phase coil and a second partial motor constituted by a second-type three-phase coil are controlled to be equal.

In addition, FIG. 6 depicts an output of the comparative six-phase motor with different numbers of turns, for comparison thereof with FIG. 5. FIG. 6 is a graph showing the case in which maximum currents (maximum phase currents) respectively applied to the first partial motor and the second partial motor are controlled to be equal (i.e., to be 500 Arms).

Similarly to FIG. 5, in FIG. 6, an output of the conventional six-phase motor is indicated by "OLD6", an output of the first partial motor is indicated by "M1", an output of the second partial motor is indicated by "M2", and where maximum phase currents respectively applied to the first partial motor and the second partial motor are controlled to be equal (i.e., to be 500 Arms), is indicated by "SUM".

In other words, in accordance with comparison results shown in Table 1 and in FIGS. 5 and 6, it may be seen that the output MAX, where the maximum output of the first partial motor and the maximum output of the second partial motor are controlled to be equal in accordance with the present disclosure, forms a higher torque in a high-speed range. This may be compared to the output SUM where the maximum currents respectively applied to the first partial motor and the second partial motor of the comparative six-phase motor with different numbers of turns are controlled to be equal.

Thus, in accordance with the present disclosure, a higher maximum motor output in a high revolutions per minute (RPM) range may be obtained and, as such, enhanced drive power performance of a vehicle may be achieved.

Figure 2:
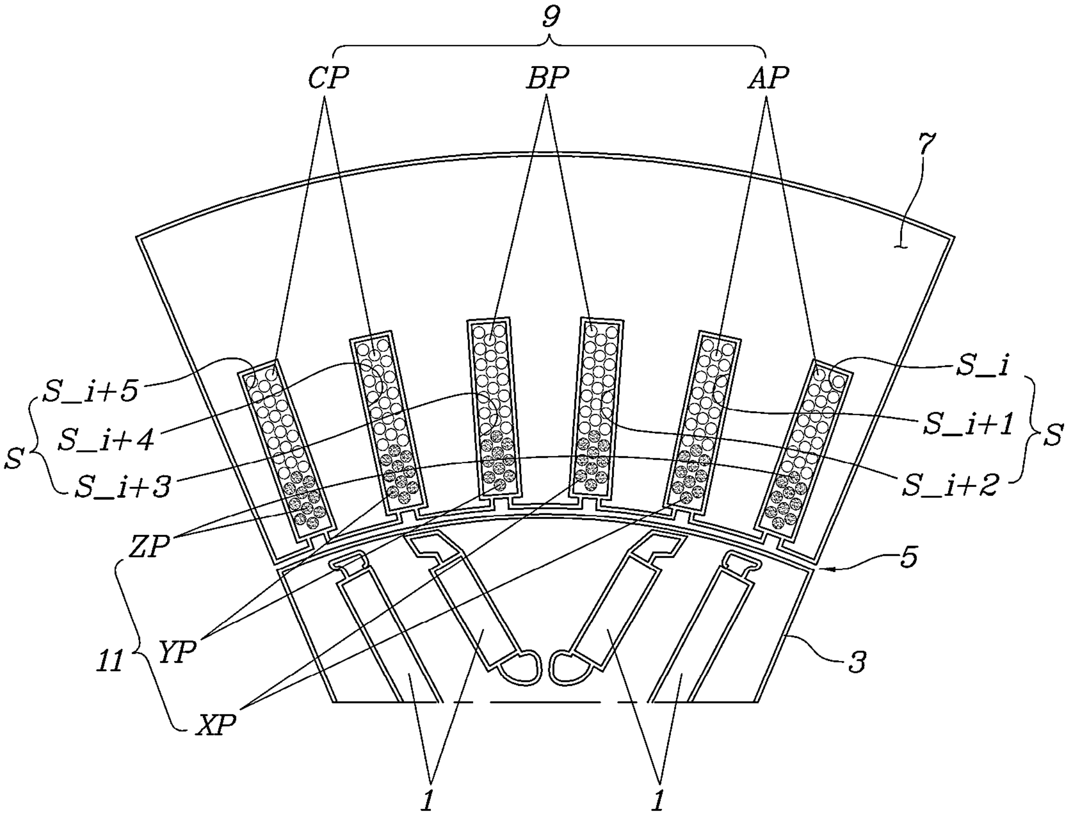
FIG. 2 is a view of an embodiment of a six-phase motor according to the present disclosure and showing sectors of a rotor and stator.
Figure 3:
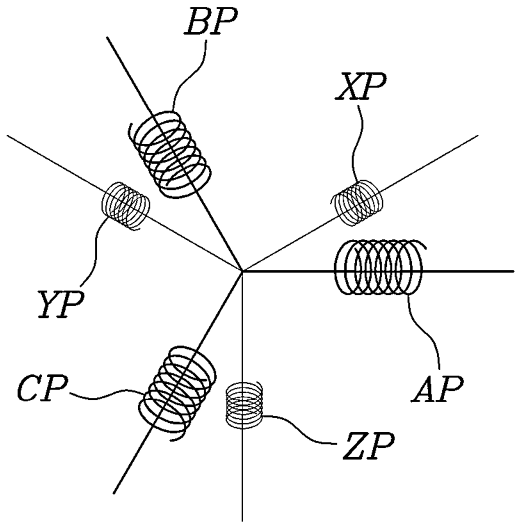
FIG. 3 is a diagram of six-phase coils disposed at the stator of FIG. 2.

In a first embodiment illustrated in FIG. 2, the three-phase coils are configured to be inserted into slots S of the stator 7. Also, both the first-type coils 9 and the second-type coils 11 are inserted into corresponding ones of the slots S, respectively.

In this case, the first-type three-phase coil is constituted by an A-phase coil AP, a B-phase coil BP, and a C-phase coil CP. The second-type three-phase coil is constituted by an X-phase coil XP, a Y-phase coil YP, and a Z-phase coil ZP. The A-phase coil AP, the B-phase coil BP, and the C-phase coil CP are sequentially disposed in a circumferential direction of the stator 7. The X-phase coil SP, the Y-phase coil YP, and the Z-phase coil ZP are sequentially disposed in a disposition direction of the A-phase coil AP, the B-phase coil BP, and the C-phase coil CP.

The X-phase coil XP is inserted into a slot into which the A-phase coil AP has been inserted and is inserted into a slot into which the B-phase coil BP has been inserted. The Y-phase coil YP is inserted into another slot into which the B-phase coil BP has been inserted and is inserted into a slot into which the C-phase coil CP has been inserted. The Z-phase coil ZP is inserted into another slot into which the C-phase coil CP has been inserted and is inserted into another slot into which the A-phase coil AP has been inserted.

For example, in this embodiment, the A-phase coil AP is inserted into an i-th slot S_i and an i+1-th slot S_i+1 of the stator 7 neighboring each other. The B-phase coil BP is inserted into an i+2-th slot S_i+2 and an i+3-th slot S_i+3 of the stator 7. The C-phase coil CP is inserted into an i+4-th slot S_i+4 and an i+5-th slot S_i+5 of the stator 7. The X-phase coil XP is inserted into the i+1-th slot S_i+1 and the i+2-th slot S_i+2 of the stator 7. The Y-phase coil YP is inserted into the i+3-th slot S_i+3 and the i+4-th slot S_i+4 of the stator 7. The Z-phase coil ZP is inserted into the i+5-th slot S_i+5 and the i-th slot S_i of the stator 7.

Accordingly, the A-phase coil AP, the B-phase coil BP, the C-phase coil CP, the X-phase coil XP, the Y-phase coil YP, and the Z-phase coil ZP are disposed such that an A-phase, an X-phase, a B-phase, a Y-phase, a C-phase, and a Z-phase are sequentially and repeatedly formed in the circumferential direction of the stator 7.

In the embodiment illustrated in FIG. 2, each of the A-phase coil AP, the B-phase coil BP, the C-phase coil CP, the X-phase coil XP, the Y-phase coil YP, and the Z-phase coil ZP has a structure to be continuously inserted into two adjacent slots. Each of the A-phase coil AP, the B-phase coil BP, the C-phase coil CP, the X-phase coil XP, the Y-phase coil YP, and the Z-phase coil ZP may have a structure to be continuously inserted into adjacent slots corresponding in number to a multiple of two, such as four, six, ore the like, in accordance with the size and structure of a motor to be configured.

In other words, for example, the coils may be disposed in such a manner that, when the A-phase coil AP is continuously inserted into first to fourth slots, the B-phase coil BP is continuously inserted into fifth to eighth slots, and the X-phase coil XP is continuously inserted into third to sixth slots.

The A-phase coil AP, the B-phase coil BP, and the C-phase coil CP are inserted into portions of the slots corresponding to an outer portion of the stator 7 in a radial direction. On the other hand, the X-phase coil XP, the Y-phase coil YP, and the Z-phase coil ZP are inserted into portions of the slots corresponding to an inner portion of the stator 7 in the radial direction.

Accordingly, a magnetic field formed by the X-phase coil XP, the Y-phase coil YP, and the Z-phase coil ZP each having a smaller number of turns is disposed nearer to the rotor 3 than a magnetic field formed by the A-phase coil AP, the B-phase coil BP, and the C-phase coil CP and, as such, may more effectively act.

The first-type coils 9 and the second-type coils 11 may be constituted by windings having different thicknesses, respectively.

In other words, the first-type coils 9 and the second-type coils 11 may be configured to have different thicknesses of windings and different numbers of turns of windings, respectively.

Figure 4:
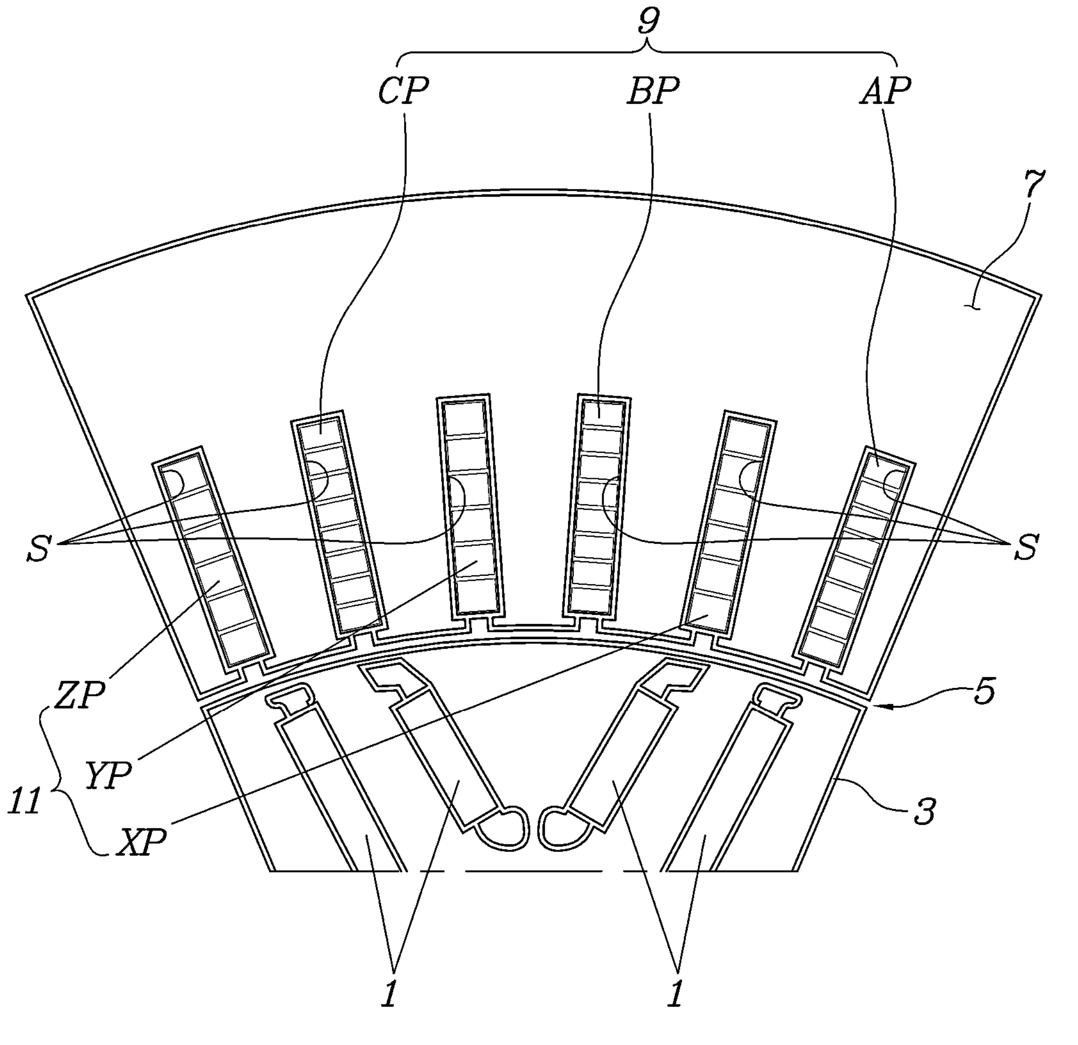
FIG. 4 is a view of another embodiment of a six-phase motor according to the present disclosure.

Meanwhile, in a second embodiment illustrated in FIG. 4, the first-type coils 9 and the second-type coils 11 are configured to be alternately inserted into a plurality of slots S disposed in the circumferential direction of the stator 7.

In other words, the first-type coils 9 are constituted by an A-phase coil AP, a B-phase coil BP, and a C-phase coil CP. The second-type coils 11 are constituted by an X-phase coil XP, a Y-phase coil YP, and a Z-phase coil ZP. The A-phase coil AP, the X-phase coil XP, the B-phase coil BP, the Y-phase coil YP, the C-phase coil CP, and the Z-phase coil ZP are sequentially disposed in the plurality of slots S disposed in the circumferential direction of the stator 7.

The above-described configuration constitutes a hairpin motor. For example, it may be seen that each of the A-phase coil AP, the B-phase coil BP, and the C-phase coil CP is inserted into each slot S by eight turns. Further, each of the X-phase coil XP, the Y-phase coil YP, and the Z-phase coil ZP is inserted into each slot S by six turns.

Meanwhile, the above-described motor of the present disclosure may perform a three-phase operation in which only the first partial motor is driven or may also perform a three-phase operation in which only the second partial motor is driven.

The three-phase operation, in which only the first partial motor is driven, may be used in an RPM range in which the motor operates at a relatively low speed. In this case, a required current may be reduced, thereby reducing copper loss. This may be compared to the case where the conventional six-phase motor is driven at the same operating point as that of the motor of the present disclosure. As a result, relatively excellent efficiency may be obtained.

In other words, the first-type coils 9 constituting the first partial motor have a greater number of turns than that of the coil of each phase constituting the conventional six-phase motor having the same size as that of the motor of the present disclosure and, as such, may be reduced in required current. A reduction in copper loss may thereby be achieved as compared to the case in which the conventional six-phase motor is driven at the same operating point as that of the motor of the present disclosure.

In addition, the three-phase operation, in which only the second partial motor is driven, may be used in an RPM range in which the motor operates at a relatively high speed. In this case, counter electromotive force may be reduced, thereby reducing field weakening control loss, as compared to the case where the conventional six-phase motor is driven at the same operating point as that of the motor of the present disclosure. As a result, relatively excellent efficiency may be obtained.

In other words, the second-type coils 11 constituting the second partial motor have a smaller number of turns than that of the coil of each phase constituting the conventional six-phase motor having the same size as that of the motor of the present disclosure and, as such, may be reduced in counter electromotive force. A reduction in field weakening control loss is thereby achieved as compared to the case where the conventional six-phase motor is driven at the same operating point as that of the motor of the present disclosure.

For reference, the "conventional six-phase motor having the same size" may be interpreted as a motor having a number of turns of the coil of each phase corresponding to an average of the number of turns of the first-type coils 9 in the first partial motor and the number of turns of the second-type coils 11 in the second partial motor.

As apparent from the above description, in accordance with the motor of the present disclosure, it may be possible to reduce iron loss and field weakening control loss according to an operating point, as compared to conventional motors, thereby achieving enhanced efficiency of the motor and an increase in maximum output of the motor. Consequently, it may be possible to achieve enhanced output performance of a vehicle to which the motor is applied while achieving an enhancement in electricity economy of the vehicle.

Although embodiments of the present disclosure have been disclosed for illustrative purposes, those of ordinary skill in the art will appreciate that various modifications, additions, and substitutions are possible, without departing from the scope and spirit of the disclosure as disclosed in the accompanying claims.

What is claimed is:

1. A six-phase motor comprising:
a rotor having a plurality of magnets;
a stator disposed to form an air gap together with the rotor;
a first-type three-phase coil provided at the stator and constituted by a plurality of first-type coils;
a second-type three-phase coil constituted by a plurality of second-type coils each wound to have a smaller number of turns than a number of turns of each of the plurality of first-type coils;
a first inverter configured to drive the first-type three-phase coil; and
a second inverter configured to drive the second-type three-phase coil while having a greater maximum output than a maximum output of the first inverter,
wherein the number of turns of the plurality of first-type coils is two times the number of turns of the plurality of second-type coils.

2. The six-phase motor according to claim 1, wherein both the plurality of first-type coils and the plurality of second-type coils are inserted into corresponding slots of the stator, respectively.

3. The six-phase motor according to claim 2, wherein:
the first-type three-phase coil is constituted by an A-phase coil, a B-phase coil, and a C-phase coil;
the second-type three-phase coil is constituted by an X-phase coil, a Y-phase coil, and a Z-phase coil;
the A-phase coil, the B-phase coil, and the C-phase coil are sequentially disposed in a circumferential direction of the stator; and
the X-phase coil, the Y-phase coil, and the Z-phase coil are sequentially disposed in a disposition direction of the A-phase coil, the B-phase coil, and the C-phase coil.

4. The six-phase motor according to claim 3, wherein the A-phase coil, the B-phase coil, the C-phase coil, the X-phase coil, the Y-phase coil, and the Z-phase coil are disposed such that an A-phase, an X-phase, a B-phase, a Y-phase, a C-phase, and a Z-phase are sequentially and repeatedly formed in the circumferential direction of the stator.

5. The six-phase motor according to claim 1, wherein the plurality of first-type coils and the plurality of second-type coils are constituted by windings having different thicknesses, respectively.

6. The six-phase motor according to claim 1, wherein the plurality of first-type coils and the plurality of second-type coils are configured to be alternately inserted into a plurality of slots disposed in a circumferential direction of the stator.

7. The six-phase motor according to claim 6, wherein:
the plurality of first-type coils is constituted by an A-phase coil, a B-phase coil, and a C-phase coil;
the plurality of second-type coils is constituted by an X-phase coil, a Y-phase coil, and a Z-phase coil; and
the A-phase coil, the X-phase coil, the B-phase coil, the Y-phase coil, the C-phase coil, and the Z-phase coil are sequentially disposed in the plurality of slots disposed in the circumferential direction of the stator.

8. A six-phase motor comprising:
a rotor having a plurality of magnets;
a stator disposed to form an air gap together with the rotor;
a first-type three-phase coil provided at the stator and constituted by a plurality of first-type coils;
a second-type three-phase coil constituted by a plurality of second-type coils each wound to have a smaller number of turns than a number of turns of each of the plurality of first-type coils;
a first inverter configured to drive the first-type three-phase coil; and
a second inverter configured to drive the second-type three-phase coil while having a greater maximum output than a maximum output of the first inverter,
wherein the maximum output of the second inverter is greater than the maximum output of the first inverter by 10% or more.

9. A six-phase motor comprising:
a rotor having a plurality of magnets;
a stator disposed to form an air gap together with the rotor;
a first-type three-phase coil provided at the stator and constituted by a plurality of first-type coils;
a second-type three-phase coil constituted by a plurality of second-type coils each wound to have a smaller number of turns than a number of turns of each of the plurality of first-type coils;
a first inverter configured to drive the first-type three-phase coil; and
a second inverter configured to drive the second-type three-phase coil while having a greater maximum output than a maximum output of the first inverter,
wherein both the plurality of first-type coils and the plurality of second-type coils are inserted into corresponding slots of the stator, respectively,
wherein the first-type three-phase coil is constituted by an A-phase coil, a B-phase coil, and a C-phase coil,
wherein the second-type three-phase coil is constituted by an X-phase coil, a Y-phase coil, and a Z-phase coil,
wherein the A-phase coil, the B-phase coil, and the C-phase coil are sequentially disposed in a circumferential direction of the stator,
wherein the X-phase coil, the Y-phase coil, and the Z-phase coil are sequentially disposed in a disposition direction of the A-phase coil, the B-phase coil, and the C-phase coil,
wherein the A-phase coil, the B-phase coil, the C-phase coil, the X-phase coil, the Y-phase coil, and the Z-phase coil are disposed such that an A-phase, an X-phase, a B-phase, a Y-phase, a C-phase, and a Z-phase are sequentially and repeatedly formed in the circumferential direction of the stator,
wherein the X-phase coil is inserted into a slot into which the A-phase coil has been inserted, and into a slot into which the B-phase coil has been inserted,
wherein the Y-phase coil is inserted into another slot into which the B-phase coil has been inserted and into a slot into which the C-phase coil has been inserted, and
wherein the Z-phase coil is inserted into another slot into which the C-phase coil has been inserted and into another slot into which the A-phase coil has been inserted.

10. The six-phase motor according to claim 9, wherein:
the A-phase coil is inserted into an i-th slot and an i+1-th slot of the stator neighboring each other;
the B-phase coil is inserted into an i+2-th slot and an i+3-th slot of the stator;
the C-phase coil is inserted into an i+4-th slot and an i+5-th slot of the stator;
the X-phase coil is inserted into the i+1-th slot and the i+2-th slot of the stator;

the Y-phase coil is inserted into the i+3-th slot and the i+4-th slot of the stator; and the Z-phase coil is inserted into the i+5-th slot and the i-th slot of the stator.

11. The six-phase motor according to claim 9, wherein each of the A-phase coil, the B-phase coil, the C-phase coil, the X-phase coil, the Y-phase coil, and the Z-phase coil is continuously inserted into adjacent slots corresponding in number to a multiple of 2.

12. The six-phase motor according to claim 9, wherein:

the A-phase coil, the B-phase coil, and the C-phase coil are inserted into portions of slots corresponding to an outer portion of the stator in a radial direction; and the X-phase coil, the Y-phase coil, and the Z-phase coil are inserted into portions of slots corresponding to an inner portion of the stator in the radial direction.

* * * * *